UNITED STATES PATENT OFFICE.

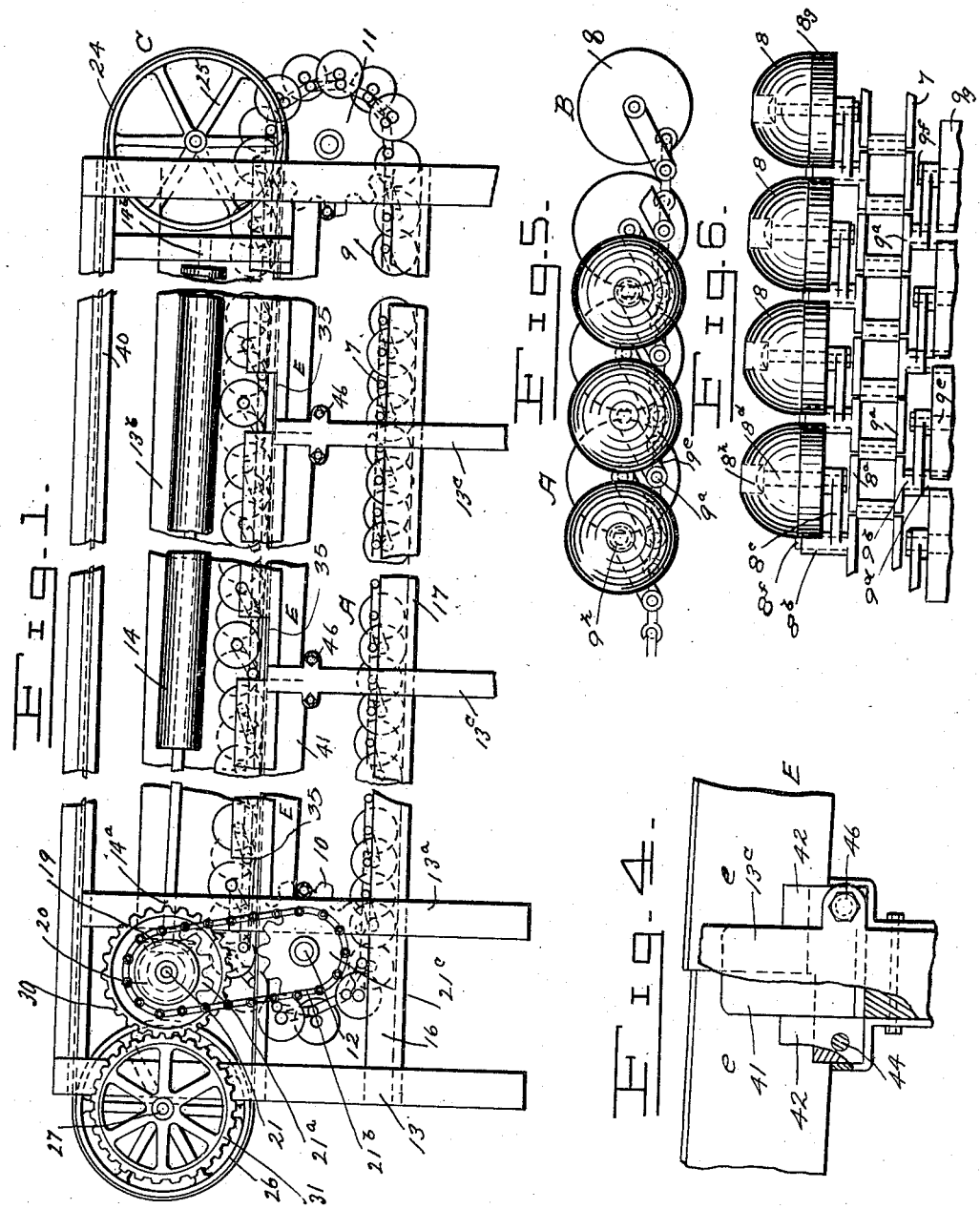

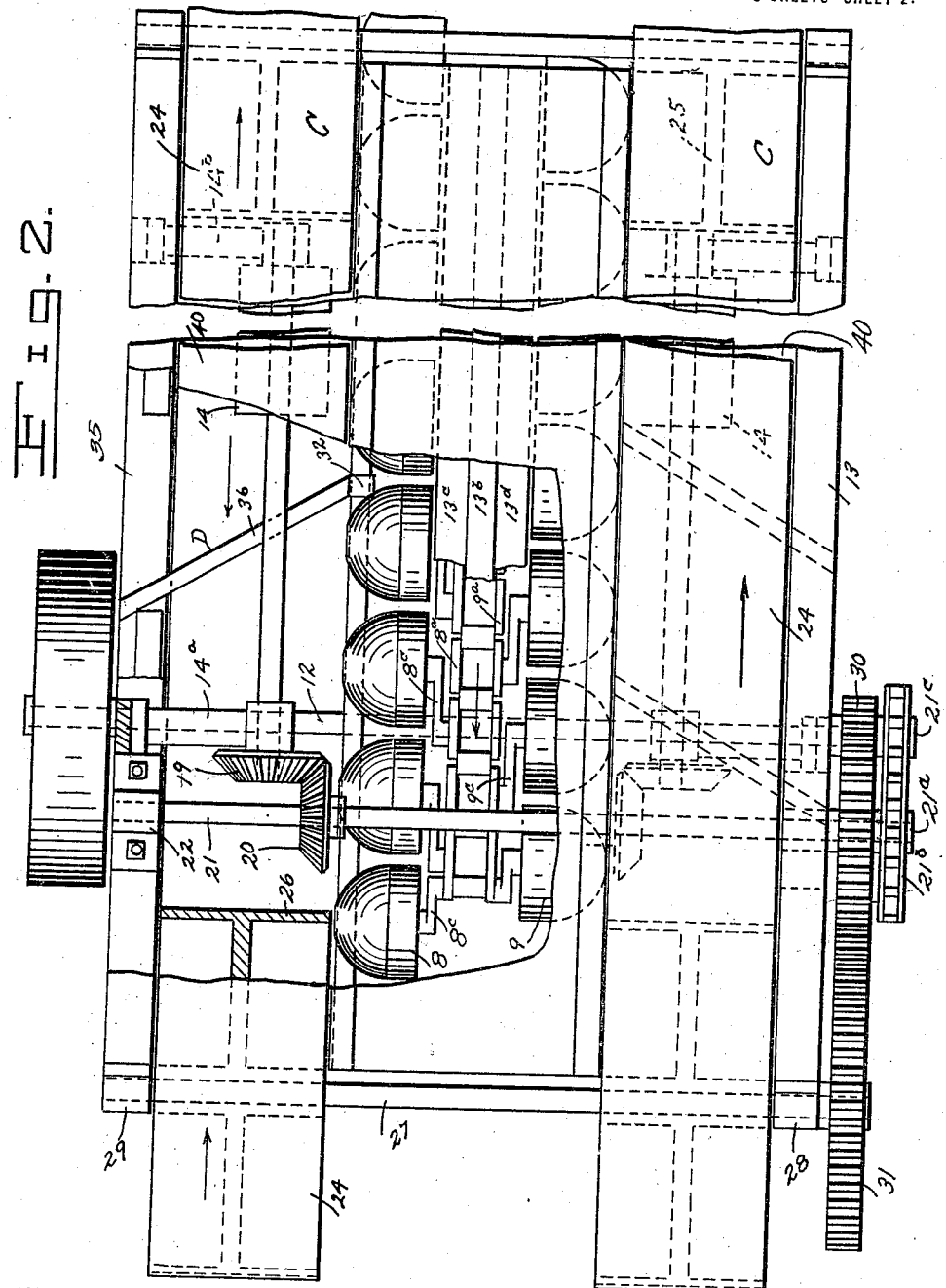

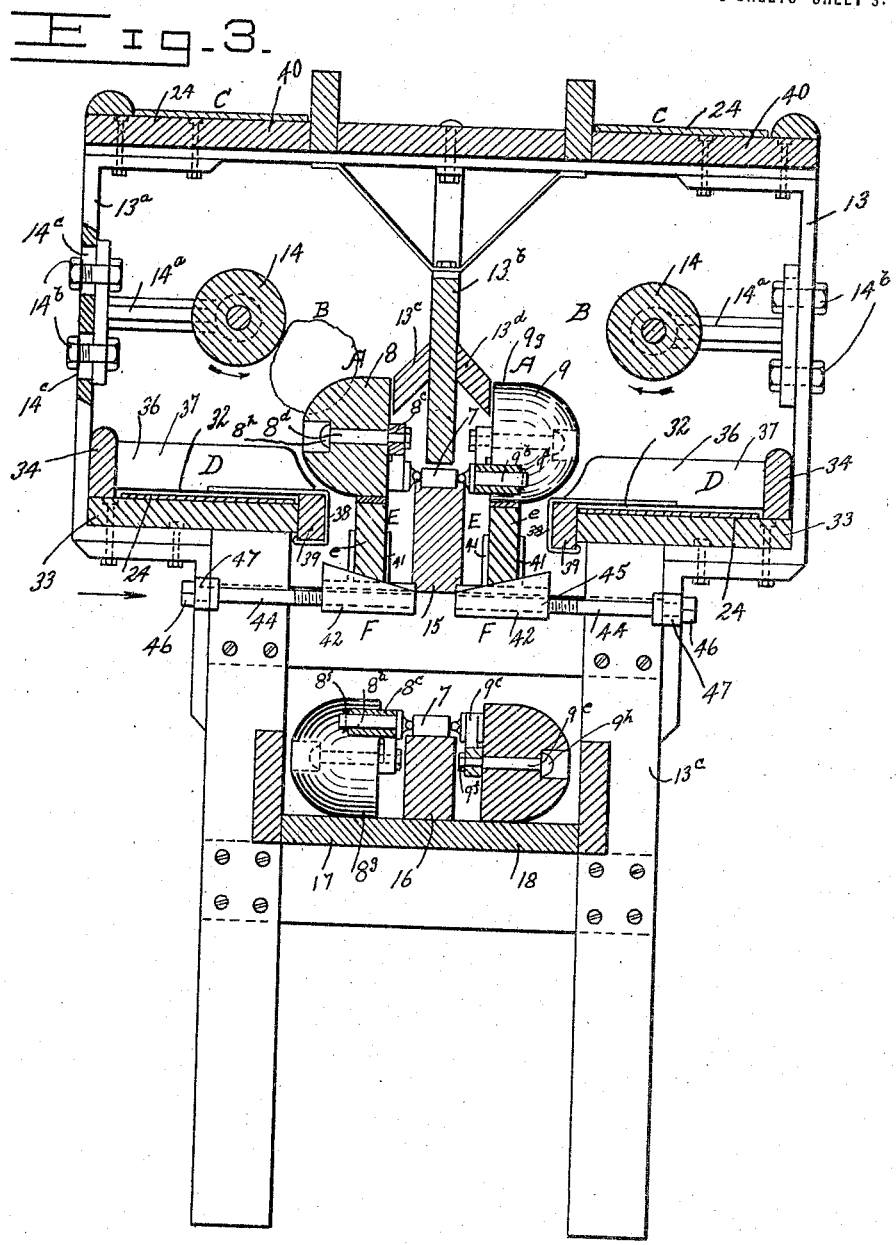

AUGUSTUS R. STEVENS, OF LINDSAY, CALIFORNIA, ASSIGNOR OF ONE-HALF TO FRED TUCKER, OF LINDSAY, CALIFORNIA.

FRUIT-GRADER.

1,296,564.  Specification of Letters Patent. Patented Mar. 4, 1919.

Application filed May 19, 1916. Serial No. 98,570.

*To all whom it may concern:*

Be it known that I, AUGUSTUS R. STEVENS, a citizen of the United States, residing at Lindsay, in the county of Tulare and State of California, have invented new and useful Improvements in Fruit-Graders, of which the following is a specification.

This invention relates to fruit graders, and more particularly to fruit graders for separating or segregating the various sizes of citrus and other fruits. The invention has for its object to provide an improved grader of the general character stated which will be continuous in its operation and which will deliver the different sizes of fruit to separate places of deposit when supplied with fruit of assorted sizes, such as oranges and the like, as received from the orchard.

In accordance with the present invention a plurality of hemispherical rollers drawn by an endless belt are caused to traverse a framework from end to end and are so arranged with relation to a roller ranging longitudinally of the framework that an orange or other fruit will be confined between adjacent hemispherical rollers and the longitudinal roller until the path of the hemispherical rollers diverges with respect to the longitudinal roller to an extent permitting the oranges or other fruit to pass under the longitudinal roller, the fruit while confined between the hemispherical rollers and the longitudinal roller being supported at three points. The longitudinal roller is rotated in a direction tending to rotate the oranges in a direction opposite that in which they rotate to roll off the hemispherical rollers, thus preventing mashing of the fruit by drawing the same under the longitudinal roller. As the oranges escape from their positions between the rollers, they roll onto a suitable conveyer which delivers all oranges of one size to the point of discharge of the particular size oranges, means being provided to keep the various sizes separated after their escape from the rollers. The conveyer is also arranged so that in its return movement it may be utilized to transport culls placed thereon back to the receiving end of the apparatus.

A further object of the invention is to provide apparatus of the general character stated which will be relatively simple and inexpensive in construction and organization, highly efficient in operation, and which will be generally superior in durability and serviceability.

With the above and other objects in view the invention consists in the novel and useful provision, formation, combination, association and inter-relation of parts, members and features, all as hereinafter described, shown in the drawings, and finally pointed out in claims.

In the drawings:

Figure 1 is a fragmentary side elevation of apparatus constructed and organized in accordance with the invention;

Fig. 2 is an enlarged fragmentary plan view of a portion of the showing in Fig. 1;

Fig. 3 is a transverse sectional view through the apparatus.

Fig. 4 is a fragmentary detail view looking in the direction of the arrow near Fig. 3;

Fig. 5 is a fragmentary detail side elevation of features of the invention, the same being shown in detached position; and Fig. 6 is a fragmentary plan view of the showing in Fig. 5.

Corresponding parts in all the figures are designated by the same reference characters.

Referring with particularity to the drawings, in which a dual unit apparatus is shown, A designates advancing means for the fruit, B designates, in each instance, retaining means to confine the fruit in its travel until the proper point of discharge is reached, C designates, in each instance, conveying means, D designates, in each instance, guide means for the discharge of the fruit from the apparatus, E designates, in each instance, adjustable guide means for the advancing means A, and F designates, in each instance, means of adjustment for the respective guide means E.

The advancing means A preferably comprises an endless link belt or chain 7, a series of rotatable hemispherical rollers 8 connected with one side of the chain 7, a series of hemispherical rollers 9 connected with the opposite side of the chain 7, and means *a* for operating said chain. The chain 7 may comprise a series of links 8$^a$ and 9$^a$ alternately arranged, the links 8$^a$ being provided with horizontally projecting studs 8$^b$ extending to one side of the chain 7 and the links 9$^a$ being provided with horizontally projecting studs 9$^b$ projecting to the other side of the chain 7. Each of the hemispherical rollers 8 is connected with a stud 8$^b$ by means of a link 8$^c$.

Each of the links 8ᶜ is provided with a horizontal stub shaft 8ᵈ upon which the respective roller 8 is rotatably mounted, the stub shafts passing through suitable apertures in the rollers and being shouldered and provided with nuts 8ᵉ for convenient attachment to and detachment from the respective links 8ᶜ. Cotters 8ᶠ are provided to maintain the links in assemblage with the respective studs 8ᵇ. Oscillatory links 9ᶜ are provided on the studs 9ᵇ and held thereto by means of cotters 9ᵈ, each of the links 9ᶜ being provided with a shouldered stub shaft 9ᵉ secured to such link by means of a nut 9ᶠ. Each of the shouldered stub shafts 9ᵉ passes through a hemispherical roller 9, the roller being freely rotatable thereon. The rollers 8 and 9 are formed with tread portions 8ᵍ and 9ᵍ, respectively, and all of such rollers are counter-bored to accommodate heads 8ʰ and 9ʰ on the respective stub shafts 8ᵈ and 9ᵉ. As the chain 7 is drawn by the operating means the rollers 8 and 9 are towed therewith through the links 8ᶜ and 9ᶜ. The operating means $a$ preferably comprises an operating socket 10, an idler sprocket 11, and a power shaft 12 upon which the operating sprocket 10 is mounted. The power shaft 10 and the idler sprocket 11 are suitably mounted at opposite ends of a framework 13 and the chain 7 is rove about the sprockets 10 and 11 in such manner that the rollers 8 and 9 connected with the upper course of the chain 7 are superposed on the adjustable guide means E and the rollers attached to the lower course of the chain 7 ranged for return over the idler sprocket 11 beneath such guide means E.

Each retaining means B consists of a roller 14 ranging longitudinally of the framework throughout the grading zone of the apparatus and rotatably mounted in such framework at one end as at 14ᵃ and at the other end as at 14ᵇ, the end 14ᵃ being slightly higher in the framework than the end 14ᵇ. One of the rollers 14 lies at one side of and slightly higher than such hemispherical rollers 8 of the series of such rollers which are in operating position, namely, above the respective guide E, and the other roller 14 lies at one side of and slightly higher than such rollers 9 of the series 9 as are in operating position and above the respective guide E. The rollers 14 are adjustable vertically in the framework as their supporting brackets 14ᵃ are secured to the remainder of the framework by means of bolts 14ᵇ passed through slots 14ᶜ in upright portions 13ᵃ of the main framework 13. In the dual unit apparatus being described the rollers 14 are shown as disposed equidistantly from the central plane of the apparatus, a vertical partition or wall 13ᵇ being provided to divide the apparatus into two sections, downwardly inclined guide walls 13ᶜ and 13ᵈ springing from the partition 13ᵇ, the inclined walls 13ᶜ terminating at the hemispherical rollers 8 in one side of the apparatus and the inclined wall 13ᵈ terminating at the hemispherical rollers 9 in the other side of the apparatus as will be clearly understood by reference to Fig. 3 of the drawings. The upper course of the chain 7 ranges beneath the partition 13ᵇ and rides in a guide-way 15 which ranges longitudinally of the framework and in the central plane thereof. The lower course of the chain is likewise provided with a guide-way or track 16 which is placed lower in the framework and in the path of return of the chain links toward the receiving end of the apparatus. The horizontal guide boards 17 and 18 are provided to support the rollers 8 and 9, respectively, in their lower course of travel with the lower course of the chain 7. The rollers 14 are each provided with a miter gear 19 and are driven from miter gears 20 provided on a transverse shaft 21 journaled at 22 in the framework 13. The shaft 21 is provided with a sprocket 21ᵃ and a chain 21ᵇ is rove about the sprocket 21ᵃ and a sprocket 21ᶜ provided on the power shaft 12.

The conveying means C, in each instance, comprises a belt 24, and one such belt is disposed at each side of the apparatus and passes completely about the respective longitudinal roller 14, from end to end thereof, an idler pulley 25 being provided for each belt at the receiving end of the apparatus, and a drive pulley 26 being provided for each belt at the tail end of the apparatus. The drive pulleys 26 are both mounted upon a shaft 27 journaled in the framework as at 28 and 29 and provided at one end with a spur gear 30 meshing with a spur gear 31 provided on the shaft 21. The idler pulleys and the drive pulleys are disposed at opposite ends of the respective rollers 14 and the inner surfaces of the conveyer belts are employed as at 32 to convey fruit which has escaped in any particular grading zone to its respective point of discharge from the apparatus. A horizontal guide plate 33 is provided for each of the belts and a side wall 34 rises from each of the guide plates 33 to confine the fruit in its travel until the proper point of discharge is reached. Apertures or gates 35 are provided in the discharge zones and a vertical discharge guide 36 is provided at each such discharge gate or opening in the respective side wall 34. These discharge guides 36 may each consist of a plate 37 abutting against the respective wall 34 and secured in position by a bent strap hooked about a longitudinally extending rail 39 one of which is secured at the inner end of each guide plate 33. The guide plates 37 may be moved along the apparatus and positioned at the proper gate or orifice to strip the fruit off the respective belt 24. These guide plates 37 constitute the discharge guide means D. It will be understood that the lower course of the belt is thus employed for conveying the fruit to the discharge gates. The upper course of each belt returning over the idler pulley to the drive pulley is guided by and supported upon a guide-way 40 and may be employed for returning culls, etc., as before stated.

The guide means E consist, in each instance, of a plurality of guide strips e ranging longitudinally of and placed end to end through the grading zones of the apparatus. These guide strips are arranged in spaced vertical guides 41 and act as adjustable tracks for the hemispherical rollers 8 and 9 the tread portions of such rollers contacting with the strips E and riding thereon, the strips E being faced with leather or other suitable material to deaden the noise and provide for smoother working.

The adjusting means F for each of the series of strips E consists of a plurality of reciprocatory wedges 42 slidable in guides 43 mounted upon transverse members 13$^c$ of the framework, which members 13$^c$ likewise support the vertical guides 41 for the strips e. The wedges 42 may be reciprocated transversely of the framework of the apparatus and transversely of the strips e by means of screw shafts 44 threaded into the respective wedges 42 as at 45, and provided with nut portions 46 whereby such screw shafts may be rotated. The screw shafts 44 are journaled in the framework in suitable bosses as at 47 and are likewise provided with end-thrust bearings in such bosses in order that the wedges will be moved upon rotation of their respective screw shafts 44.

It will of course be understood that the framework 13 may be constructed of wood or other suitable material and may comprise such longitudinally ranging, upright, and transverse members as are required to properly support and aline the moving parts of the grader.

It will also be understood that while a dual unit grader has been particularly described, the construction of a single unit grader, should such be desired, will be well understood from the foregoing disclosure; however, the advantages of the double unit type with respect to doubled capacity, space conservation, etc., will be apparent.

The operation, method of use and advantages of the invention will be readily understood from the foregoing description, taken in connection with the accompanying drawings and the following statement:

Power being applied to the power shaft 12 through the pulley thereon, the chain 7 with the hemispherical rollers 8 and 9 will be drawn toward the tail end of the apparatus where the power shaft is located and oranges or the like fed to the spaces between the hemispherical rollers 8 and 9 and their respective confining rolls 14 will be positively drawn along the apparatus by the rolls 8 and 9 an orange occupying each of the spaces between adjacent rolls and being confined or held thereto by means of the respective longitudinal roller 14 which is driven through its bevel gears and train of connections with the power shaft as will be understood. The direction of rotation of the rolls 14 is indicated by arrows in Fig. 3 and the oranges or the like will be rotated and given a compound movement due to the three-point contact of the same with the respective roller 14 and adjacent rollers 8 or 9 such adjacent rollers coöperating with the respective roller 14 permitting the gaging of oblong fruit at its lesser diameter and permitting the same to escape from its position on the hemispherical rollers and under the roller 14 when it has been carried on the hemispherical rollers to its proper point of discharge which is determined by the adjustment of the respective guide means E. Each such guide means E is adjusted by means of its wedge 42 of the respective adjusting means F by turning the respective screw shaft 44 to wedge up the respective guide strip e or to lower the same to the desired position of adjustment. It will be understood that the tread portions of the hemispherical rollers are nearest the chain and the spherical portions faced outwardly from the chain toward the sides of the apparatus and the rolls 14. The guide strips e are adjusted in parallel with the respective rollers 14 and such guide strips nearest the receiving end of the apparatus are closest to the rollers 14 while the guide strips e at the tail end of the apparatus are positioned farther away from the rolls 14 such guide strips being arranged in a series of steps so that while the chain 7 may move in a straight path on its guide or way 15 the hemispherical rollers 8 and 9 will, due to gravitation, follow their respective guide strips e and provide zones of escape from the rolls for the oranges or the like, such zones being arranged in a progressive series the first of the zones permitting the escape of only the smallest size oranges while the next zone with a greater interspace between the rollers 14 and the hemispherical rollers 8 and 9 permits of escape of the next size oranges, and so on throughout the series. The rollers 14 are cut away at their extreme ends near the tail end of the apparatus so that all fruit which has not been sized or which for any reason did not escape through any of the earlier grading zones may escape. The escape of the fruit in the various zones is onto its respective conveyer belt 24 from which it is stripped by the respective plate 37 and guided to a gate or office through which it may roll to the proper bin for packing or further handling.

Having thus disclosed my invention I claim and desire to secure by Letters Patent:

1. A fruit grader including a conveyer provided with a series of spaced rolling members arranged to support the fruit as it is advanced, a longitudinally extending confining roller arranged substantially parallel to the path of the conveyer, and means for supporting the spaced rolling members in a graduated relation to the confining roller to provide for grading, each article of fruit having a three point rolling support upon two of the rolling members and the confining roller.

2. A fruit grader including a conveyer provided with a series of spaced rolling members arranged to rotate and support the fruit as it is advanced, a longitudinally extending confining roller arranged substantially parallel to the path of the conveyer, an adjustable guide for the rolling members whereby a graduated relation is established between the confining roller and the series of rolling members, each article of fruit having a three point rolling support upon two of the rolling members and the confining roller.

3. An improved fruit grader, comprising a plurality of spaced conveying bodies, means for advancing the same along a predetermined path, means for confining the fruit in conjuction with such bodies in the advance of the bodies and fruit to a point at which the fruit escapes from such confining means, means in step formation upon which such bodies are supported in the advance thereof, and means for varying such step formation; said last named means producing a progressively wider interspace as between the said steps thereof and said temporary confining means; said temporary confining means comprising a roller extending substantially parallel with the course of travel of said bodies, whereby the fruit has a three-point support upon two of said bodies and said roller prior to the grading of the fruit.

4. An improved fruit grader, comprising a plurality of spaced conveying bodies, means for advancing the same along a pre-determined path, means for confining the fruit in conjunction with such bodies in the advance of the bodies and fruit to a point at which the fruit escapes from each confining means, means in step formation upon which such bodies are supported in the advance thereof, and means for varying such step formation; said last named means producing a progressively wider interspace as between the said steps thereof and said temporary confining means; said temporary confining means comprising a roller extending substantially parallel with the course of travel of said bodies, whereby the fruit has a three-point support upon two of said bodies and said roller prior to the grading of the fruit; said means in step formation being adapted to rotate the fruit on one axis and said roller being adapted to impart rotation to the fruit upon another axis.

5. A fruit grader including a movable belt, a series of spaced rolling members trailing from one side of the belt and movable vertically independently thereof, a longitudinally extending confining member arranged substantially parallel to the path of the conveyer, and an adjustable track for the rolling members whereby a graduated relation is maintained between the confining member and series of rolling members, each article of fruit having a three point support upon two of the rolling members and the confining member.

6. A fruit grader including a movable belt, a series of spaced rolling members trailing from one side of the belt and movable vertically independently thereof, a longitudinally extending confining roller arranged substantially parallel to the path of the conveyer, and a stepped track supporting the rolling members in a graduated relation to the confining roller, each article of fruit having a three point roller support upon two of the rolling members and the confining roller.

7. An improved fruit grader, comprising a run-way including a plurality of relatively movable vertically adjustable guides, means for advancing a plurality of bodies lengthwise of the run-way and over said guides, means for relatively adjusting said guides, and a member ranging lengthwise of the run-way and spaced from said bodies to provide an opening of varying width through which the fruit may be progressively graded, said bodies being mounted for rotation, and said last named member consisting of a roller; said bodies being subjected to rotation by contact with said guides to rotate the fruit upon one axis, and said roller being rotatable to impart rotation to said fruit upon another axis.

8. An improved fruit grader, comprising a run-way including a plurality of relatively movable vertically adjustable guides, means for advancing a plurality of bodies lengthwise of the run-way and over said guides, means for relatively adjusting said guides, and a member ranging lengthwise of the run-way and spaced from said bodies to provide an opening of varying width through which the fruit may be progressively graded, said bodies being mounted for rotation, and said last named member consisting of a roller; said bodies being subjected to rotation by contact with said guides to rotate the fruit upon one axis, and said roller being rotatable to impart rotation to said fruit upon another axis; together with means for advancing said bodies lengthwise of the run-way.

9. An improved fruit grader, comprising a run-way including a plurality of relatively movable vertically adjustable guides, means for advancing a plurality of bodies lengthwise of the run-way and over said guides, means for relatively adjusting said guides, and a member ranging lengthwise of the run-way and spaced from said bodies to provide an opening of varying width through which the fruit may be progressively graded, said bodies being mounted for rotation, and said last named member consisting of a roller; said bodies being subjected to rotation by contact with said guides to rotate the fruit upon one axis, and said roller being rotatable to impart rotation to said fruit upon another axis; together with means for advancing said bodies lengthwise of the run-way; said run-way being provided with wedges upon which said guides are mounted, and means for operating said wedges to vertically adjust said guides.

In testimony whereof, I have signed my name to this specification in the presence of two subscribing witnesses.

AUGUSTUS R. STEVENS.

Witnesses:
 ALFRED H. DAEHLER,
 L. S. ARNOLD.

Copies of this patent may be obtained for five cents each, by addressing the "Commissioner of Patents, Washington, D. C."